United States Patent
Okamoto et al.

(10) Patent No.: US 9,026,307 B2
(45) Date of Patent: May 5, 2015

(54) VEHICLE CONTROL SYSTEM

(75) Inventors: Keisuke Okamoto, Tokyo (JP); Nobuhide Sugimoto, Yokohama (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1390 days.

(21) Appl. No.: 12/523,273

(22) PCT Filed: Jan. 17, 2008

(86) PCT No.: PCT/JP2008/050541
§ 371 (c)(1),
(2), (4) Date: Nov. 4, 2009

(87) PCT Pub. No.: WO2008/088023
PCT Pub. Date: Jul. 24, 2008

(65) Prior Publication Data
US 2010/0070106 A1 Mar. 18, 2010

(30) Foreign Application Priority Data
Jan. 18, 2007 (JP) .................................. 2007-009526

(51) Int. Cl.
G06F 13/00 (2006.01)
H04L 29/08 (2006.01)
G06F 15/163 (2006.01)

(52) U.S. Cl.
CPC .............. *H04L 67/12* (2013.01); *G06F 15/163* (2013.01)

(58) Field of Classification Search
CPC .............................. H04L 67/12; G06F 15/163
USPC ................... 701/34.3; 714/25, 47.1
See application file for complete search history.

(56) References Cited

U.S. PATENT DOCUMENTS

| | | | |
|---|---|---|---|
| 6,757,761 B1* | 6/2004 | Smith et al. | 710/100 |
| 2003/0036823 A1* | 2/2003 | Mahvi | 701/1 |
| 2003/0093199 A1* | 5/2003 | Mavreas | 701/33 |
| 2007/0005802 A1* | 1/2007 | Barkowski et al. | 709/240 |

FOREIGN PATENT DOCUMENTS

| | | |
|---|---|---|
| JP | 10-27110 A | 1/1998 |
| JP | 2000-293499 A | 10/2000 |
| JP | 2000-349780 A | 12/2000 |

(Continued)

OTHER PUBLICATIONS

Y. Endo, M. Okude, K. Nakamura, T. Kamiwaki and K. Sugiura, In-Vehicle Multimedia Platform Based on Darma (Dual Os Approach), In. Proc. 7th World Congress on Intelligent Systems, Turin, Italy, Nov. 2000.*

*Primary Examiner* — Russell Frejd
*Assistant Examiner* — Peter D Nolan
(74) *Attorney, Agent, or Firm* — Kenyon & Kenyon LLP (57) ABSTRACT

A vehicle control system including: a first vehicle control unit configured to include a first vehicle control unit configured to include a first processor installed with a real-time OS; and a second vehicle control unit configured to include a second processor installed with a real-time OS and a third processor installed with a multimedia OS, wherein the first processor and the second processor are configured to perform communication between the first vehicle control unit and the second vehicle control unit, and a communication function of the second processor and a communication function of the third processor are configured to perform communication between the second processor and the third processor.

11 Claims, 4 Drawing Sheets

(56) References Cited

FOREIGN PATENT DOCUMENTS

| | | |
|---|---|---|
| JP | 2002-278799 A | 9/2002 |
| JP | 2002-331882 A | 11/2002 |
| JP | 2003-223341 A | 8/2003 |
| JP | 2003-288237 A | 10/2003 |
| JP | 2003-309509 A | 10/2003 |
| JP | 2005-352669 A | 12/2005 |
| JP | 2006-004092 A | 1/2006 |
| JP | 2006004092 A * | 1/2006 |
| JP | 2006-51922 A | 2/2006 |
| JP | 2006-302270 A | 11/2006 |
| JP | 2006302270 A * | 11/2006 |

\* cited by examiner

VEHICLE CONTROL SYSTEM

This is a 371 national phase application of PCT/JP2008/050541 filed 17 Jan. 2008, which claims priority to Japanese Patent Application No. 2007-009526 filed 18 Jan. 2007, the contents of which are incorporated herein by reference.

TECHNICAL FIELD

The present invention relates to a vehicle control system including a plurality of vehicle control units which communicate with each other.

BACKGROUND ART

Conventionally, a multiprocessor system which transmits and receives information between a plurality of processors has been known (see, e.g., Patent Document 1). The multiprocessor system transmits and receives event information between the processors in each of which a real-time OS (operating system) is installed.

Patent Document 1: Japanese Laid-Open Patent Application No. 2000-293499

DISCLOSURE OF INVENTION

Problem to be Solved by the Invention

Recently, a tendency to heighten an added value and a function has been developed by causing a multimedia function (information system) to cooperate with a vehicle control function (control system). For example, a system, which utilizes a navigation system installed with a multimedia function in order to detect a curve ahead of a vehicle by using a map information in the navigation system, and a vehicle control system installed with a vehicle control function in order to decelerate the vehicle automatically and/or assist steering control of a driver automatically based on a detected information of the curve, have been developed.

While enhanced reliability and real-time processing that can provide a long term operational stability are required for a control system electronic control unit, high-level multimedia processing, and a formulation and an update of a flexible functional structure are required for an information system electronic control unit which has a multimedia function. Thus, the control system electronic control unit and the information system electronic control unit do not use a common OS, i.e. one type of OS. The control system electronic control unit uses a real-time OS suitable for vehicle control. The information system electronic control unit uses an OS suitable for multimedia processing.

Since a system (including an OS) which executes multimedia processing has multiple functions and an updating cycle of the system due to a development of the technology is short, a software reliability of the system tends to be decreased. There is a possibility that operating a whole system of a vehicle becomes difficult in a case where a software failure occurs in the information system electronic control unit and reaches to the control system electronic control unit which is operating normally.

Accordingly, the aforementioned conventional system which transmits and receives information between the processors installed with the real-time OS can not solve the aforementioned problem occurred when the system causes a control system electronic control unit installed with an OS suitable for vehicle control to cooperate with an information system electronic control unit installed with an OS suitable for multimedia processing.

Thus, it is an object of the present invention to provide a vehicle control system which includes a platform compatible with a real-time processing and enhanced reliability required for a control system electronic control unit, and flexibility and extensibility required for an information system electronic control unit.

Means for Solving the Problems

In a first aspect of the present invention, a vehicle control system includes a first vehicle control unit configured to include a first processor installed with a real-time OS; and a second vehicle control unit configured to include a second processor installed with a real-time OS and a third processor installed with a multimedia OS, wherein the first processor and the second processor are configured to perform communication between the first vehicle control unit and the second vehicle control unit, and a communication function of the second processor and a communication function of the third processor are configured to perform communication between the second processor and the third processor.

In a second aspect, in the above vehicle control system according to the first aspect, further includes a third vehicle control unit configured to include a fourth processor installed with a multimedia OS, wherein the third processor and the fourth processor are configured to perform communication between the second vehicle control unit and the third vehicle control unit.

In a third aspect, in the above vehicle control system according to the first aspect, wherein the third processor is configured to access an external communication device.

In a fourth aspect, in the above vehicle control system according to the first aspect, wherein the fourth processor is configured to access an external communication device.

In a fifth aspect, in the above vehicle control system according to the second aspect, wherein the third vehicle control unit further includes a fifth processor installed with a multimedia OS, and wherein a communication function of the fourth processor and a communication function of the fifth processor are configured to perform communication between the fourth processor and the fifth processor, and the fifth processor is configured to access an external communication device.

In a sixth aspect, in the above vehicle control system according to the first aspect, wherein the second processor is formed of a processor-core in a multiple-core processor, and the third processor is formed of a processor-core in the multiple-core processor.

In a seventh aspect, in the above vehicle control system according to the fifth aspect, wherein the fourth processor is formed of a processor-core in a multiple-core processor, and the fifth processor is formed of a processor-core in the multiple-core processor.

Effects of the Invention

In accordance with the present invention, a platform compatible with a real-time processing and enhanced reliability required for a control system electronic control unit, and flexibility and extensibility required for an information system electronic control unit can be provided.

DESCRIPTION OF REFERENCE NUMERALS

10 Single-core processor
20, 30 Multiple-core processor
20a~d, 30a~d Processor-core
11a, 21a RT-OS (Real-Time OS)
21b~d, 31a~d MM-OS (Multimedia OS)
22 CAN protocol stack
23 Vehicle G/W function
24 Inter-core communication function
25 Application function
26 External G/W function
27 TCP/IP protocol stack
28 Inter-core communication function
100 Control system ECU
200, 300 Information system ECU

BEST MODE FOR CARRYING OUT THE INVENTION

In the following, preferred embodiments of the present invention are described with reference to the drawings.

Embodiment 1

Figure 1A:
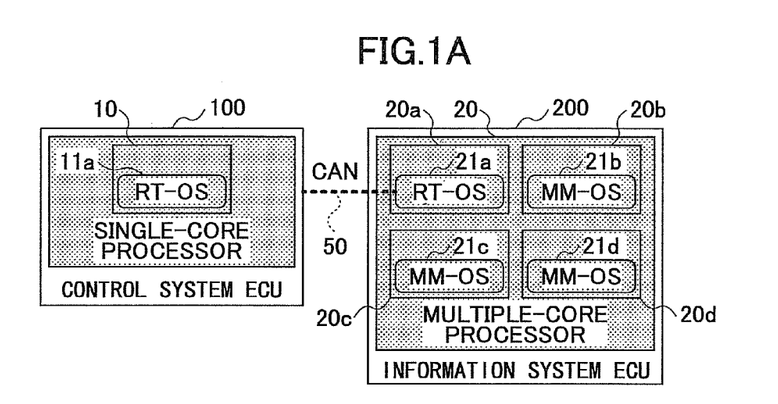
FIGS. 1A and 1B show block diagrams of a vehicle control system according, to embodiment 1 of the present invention.
Figure 1B:
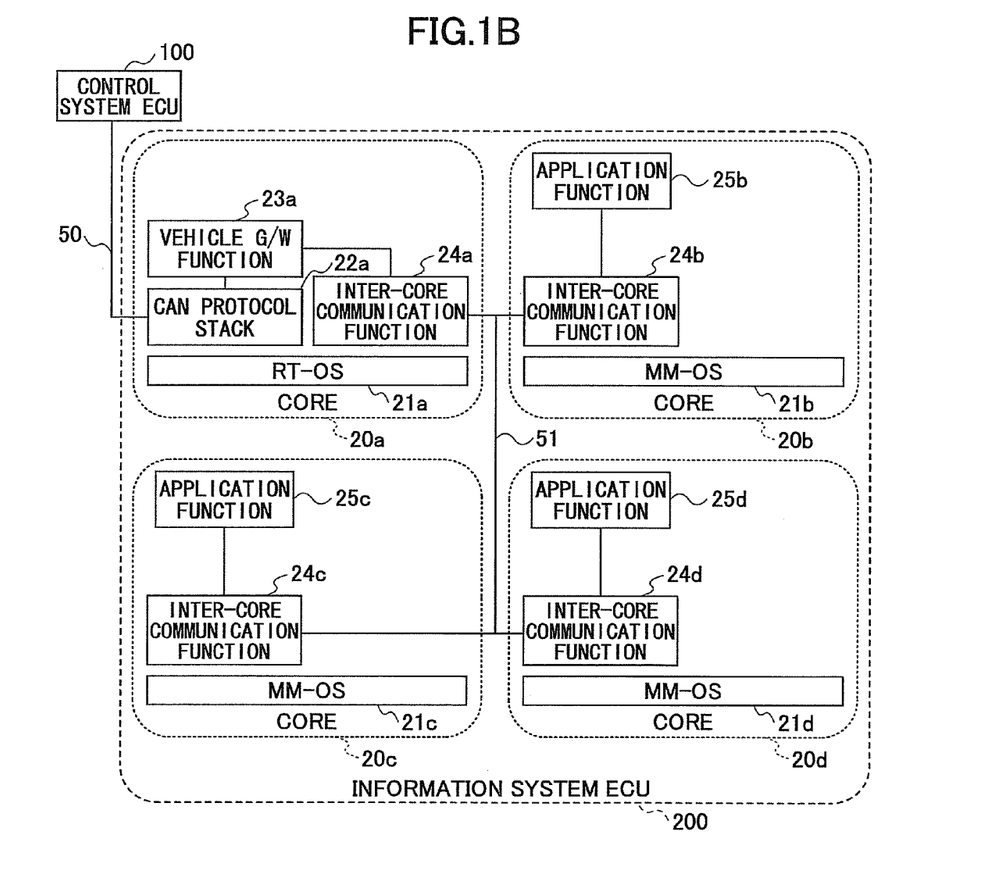

FIGS. 1A and 1B show block diagrams of a vehicle control system according to embodiment 1 of the present invention. The vehicle control system according to embodiment 1 includes a control system ECU 100 which constitutes a control system electronic control unit, and an information system ECU 200 which constitutes an information system electronic control unit. The control system ECU 100 and the information system ECU 200 are mounted on a vehicle and communicate with each other.

The control system ECU has a vehicle control function and controls vehicle motion, i.e. moving, curving, and stopping, for example. Examples of the control system ECU include an engine ECU for controlling an engine, a steering ECU for steering control, and a brake ECU for brake control. As shown in FIG. 1A, the control system ECU 100 includes a single-core processor 10 (hereinafter referred to as a core 10) including a processor-core. The core 10 is installed with a real-time operating system (hereinafter referred to as an RT-OS) 11a. The core 10 processes the RT-OS 11a.

The RT-OS has enhanced functions for batch processing and TSS (Time Sharing System) in order to give priority to the real-time processing. In the case of a control program used in a control system ECU 100 for vehicle control, the RT-OS is used because it is capable of processing certain processes in real time that need the real-time processing in order to ensure high levels of control response and safety. Examples of the RT-OS include OSEC and ITRON.

The information system ECU has a multimedia function and controls additional functions other than, for example, basic vehicle functions. Examples of the information system ECU include a vehicle navigation computer, a DVD (digital versatile disc) or video computer, an Internet access computer, and a communications computer for communicating with other vehicles or an external communications facility, such as roadside communication infrastructure or a management center. As shown in FIG. 1A, the information system ECU 200 includes a multiple-core processor 20 including a plurality of processor-cores. The multiple-core processor is formed of a micro processor including more than two processor-cores that are integrated as a single package. The processor-cores in the multiple-core processor operate independently from each other. The multiple-core processor 20 includes four processor-cores 20a, 20b, 20c, and 20d. The processor-core 20a is installed with an RT-OS 21a, and the processor-cores 20b, 20c, and 20d are installed with multimedia operating systems (hereinafter referred to as MM-OS) 21b, 21c, and 21d respectively. The processor-core 20a processes the RT-OS 21a, the processor-core 20b processes the MM-OS 21b, the processor-core 20c processes the MM-OS 21c, and the processor-core 20d processes the MM-OS 21d.

The MM-OS is superior to RT-OS in handling compression/expansion processing such as an MPEG codec, user interface processes such as GUI (Graphical User Interface), and multimedia processes such as an Internet connection process including security management. In the information system ECU 200, an MM-OS capable of realizing required multimedia processing is used. Examples of the MM-OS include Linux (registered trademark) and QNX (registered trademark).

The core 10 installed with the RT-OS 11a and the core 20a installed with the RT-OS 21a are configured to perform communication between the control system ECU 100 and the information system ECU 200 via a communication line 50 as shown in FIG. 1A.

The core 20a in the information system ECU 200 executes an inter-ECU communication program on the RT-OS 21a in order to communicate with the control system ECU 100. Similarly, the core 10 in the control system ECU 100 executes an inter-ECU communication program on the RT-OS 11a in order to communicate with the information system ECU 200. The inter-ECU communication program in the information system ECU 200 realizes a CAN protocol stack 22a and a vehicle gateway (G/W) function 23a as shown in FIG. 1B (A CAN protocol stack and a vehicle G/W function are not shown in the control system ECU 100).

The CAN protocol stack selects a CAN protocol necessary for the inter-ECU communication in order to connect the control system ECU 100 and the information system ECU 200 via a control system communication protocol such as CAN.

The vehicle G/W function 23a performs a predetermined cooperative process in order to cause the control system ECU 100 to cooperate with the information system ECU 200. Examples of the predetermined cooperative process include a real-time process for communication and data processing required between the control system ECU 100 and the information system ECU 200, and a security management process for access control performed between the control system ECU 100 and the information system ECU 200 when reading a function or passing data therebetween. For example, when the vehicle G/W function 23a in the information ECU 200 performs data processing, the vehicle G/W function 23a reads a request signal received from the control system ECU 100 and sends the request signal to an MM-OS in the information system ECU 200, and returns a processing result of the MM-OS to the control system ECU 100.

As shown in FIG. 1B, communication among the cores 20a~20d is performed via a communication line 51 by an inter-core communication function 24a of the core 20a installed with the RT-OS 21a, an inter-core communication function 24b of the core 20b installed with the MM-OS 21b, an inter-core communication function 24c of the core 20c installed with the MM-OS 21c, and an inter-core communication function 24d of the core 20d installed with the MM-OS 21d.

Each of the cores 20a~20d executes an inter-core communication program on its respective OS in order to obtain the respective inter-core communication functions 24a~24d. The cores 20a~20d in the information system ECU 200 are configured to perform communication by executing the inter-core communication programs. The inter-core communication programs realize the inter-core communication functions 24a~24d shown in FIG. 1B.

The inter-core communication functions 24a~24d perform data communications such as data communications between the core 20a installed with the RT-OS 21a and the cores 20b~20d installed with the MM-OS's 21b~21d respectively, and data communications between a shared memory and the cores 20a~20d. The inter-core communication function 24a performed on the RT-OS 21a monitors if the cores 20b~20d operate normally by communicating with the inter-core communication functions 24b~24d periodically (monitoring function). The cores 20a~20d further include an assist function for assisting parallel processing of an application function which will become apparent below.

The information system ECU 200 is installed with multimedia processing system application programs that are executed respectively by the cores 20b~20d installed with the MM-OS's 21b~21d. The application programs are executed to perform application functions 25b~25d as shown in FIG. 1B.

The application functions 25b~25d perform multimedia processes such as compression/expansion processing of an MPEG codec etc., and user interface processes such as GUI (Graphical User Interface) etc.

As described above, the vehicle control system according to embodiment 1 of the present invention can provide cooperation arranged with security and real-time processing between the control system ECU 100 and the information system ECU 200 by including the RT-OS 11a in the control system ECU 100, the RT-OS 21a in the information system ECU 200, the CAN protocol stack 22a, the vehicle G/W function 23a, and the inter-core communication functions 24a~24d. Further, the monitoring function enhances reliability of a whole system including the control system ECU 100 and the information system ECU 200.

The control system ECU 100 and the information system ECU 200 communicate with each other via the RT-OS 11a and the RT-OS 21a. The RT-OS 11a in the control system ECU 100 does not communicate with any of the MM-OS's 21b~22d directly. The vehicle control system according to embodiment 1 provides a platform compatible with real-time processing and enhanced reliability required for a control system ECU, and flexibility and extensibility required for an information system ECU.

Embodiment 2

Figure 2A:
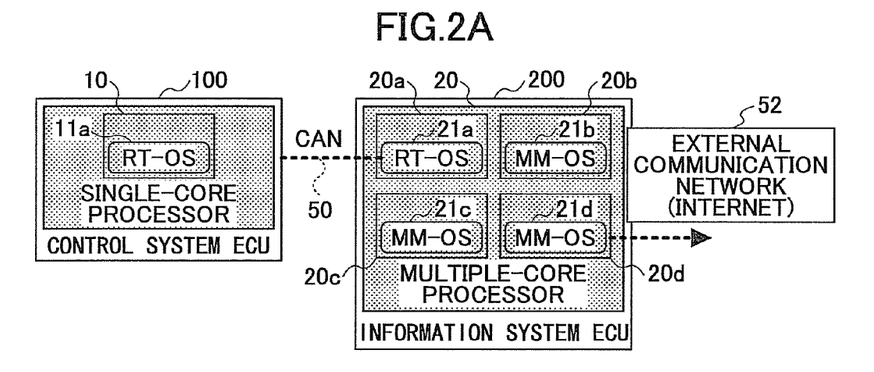
FIGS. 2A and 2B show block diagrams of a vehicle control system according to embodiment 2 of the present invention.
Figure 2B:
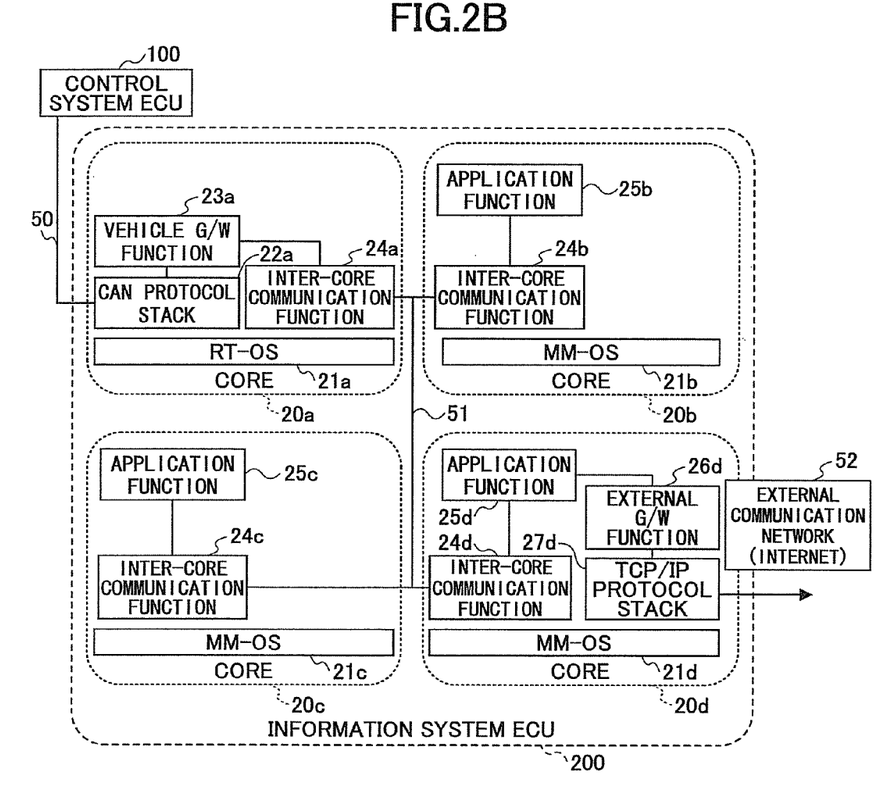

FIGS. 2A and 2B show block diagrams of a vehicle control system according to embodiment 2 of the present invention. The vehicle control system according to embodiment 2 includes the control system ECU 100 and the information system ECU 200 as well as the vehicle control system according to embodiment 1. Hereinafter, the same elements as or similar elements to those of the vehicle control system according to embodiment 1 are referred to by the same reference numerals, and a description thereof is omitted. The control system ECU 100 and the information system ECU 200 according to embodiment 2 are mounted on a vehicle and communicate with each other.

The information system ECU 200 according to embodiment 2 accesses an external communication device (not shown) located outside the vehicle via an external communication network 52 such as the Internet. Examples of the communication device include a personal computer, a cellular phone handset, a communication device mounted on another vehicle, a roadside communication infrastructure, and a predetermined information management center. As shown in FIG. 2A, the core 20d installed with the MM-OS 21d accesses the external communication device.

The core 20d in the information system ECU 200 executes an external communication program on the MM-OS 21d in order to access the external communication device. The external communication program realizes an external G/W function 26d and a TCP/IP protocol stack 27d as shown in FIG. 2B.

The external G/W function 26d performs a security management process required when the core 20d accesses the external communication device. In a case where a program and/or a file for an additional function is downloaded from the external communication device, the core 20d checks if the downloaded program and/or file includes a falsification or a virus, and then installs and executes the downloaded program and/or file in the core 20d, i.e. sandboxing the core 20d. The downloaded program and/or file is downloaded on the MM-OS 21d in the core 20d, and is used in the core 20d.

The TCP/IP protocol stack 27d selects a TCP/IP protocol required when the core 20d accesses the external communication device via the external communication network 52 such as the Internet.

As described above, the core 20d downloads an application program from the external communication device, and executes it. The vehicle control system according to embodiment 2 of the present invention thus executes the application program securely, and provides cooperation arranged with security and the real-time processing between the control system ECU 100 and the information system ECU 200.

Embodiment 3

Figure 3A:
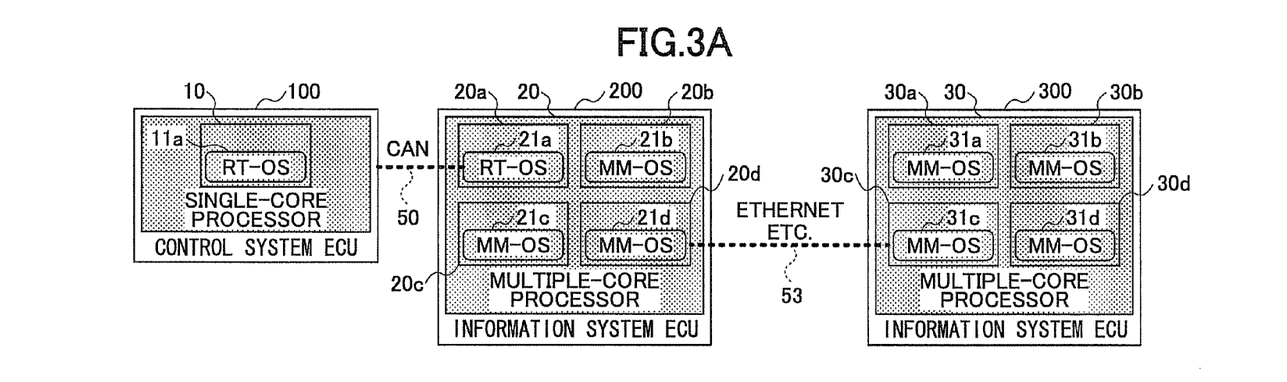
FIGS. 3A and 3B show block diagrams of a vehicle control system according to embodiment 3 of the present invention.
Figure 3B:
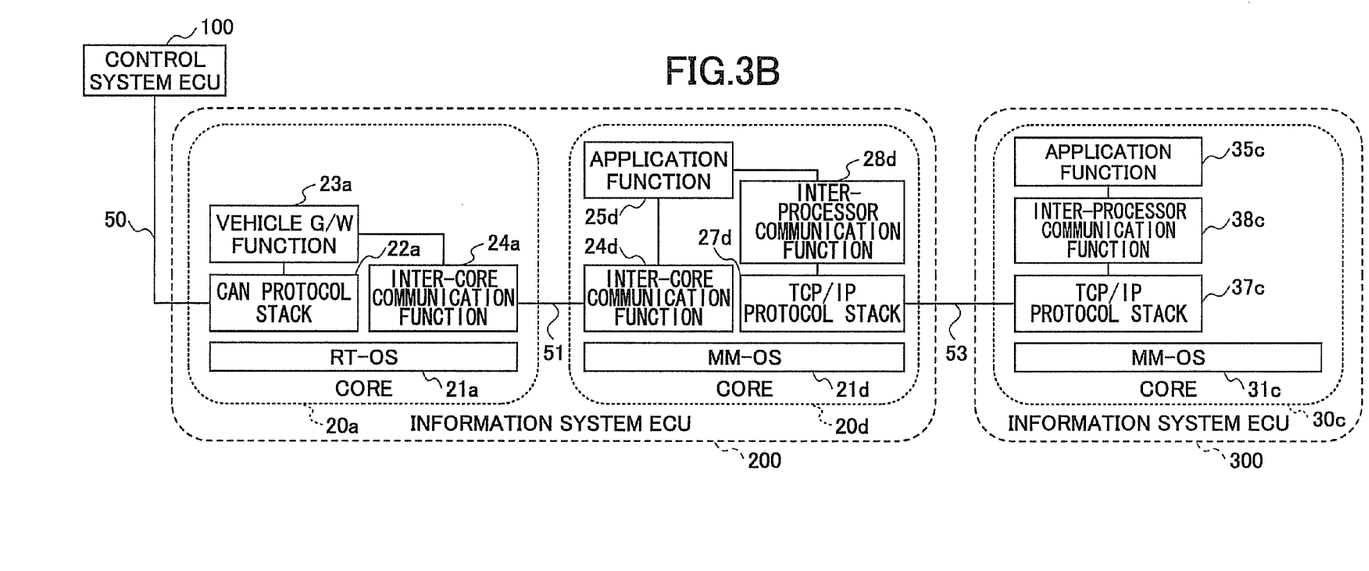

FIGS. 3A and 3B show block diagrams of a vehicle control system according to embodiment 3 of the present invention. The vehicle control system according to embodiment 3 includes the control system ECU 100, the information system ECU 200, and an information system ECU 300. Hereinafter, the same elements as or similar elements to those of the vehicle control system according to embodiments 1 and 2 are referred to by the same reference numerals, and a description thereof is omitted. The control system ECU 100, the information system ECU 200, and the information system ECU 300 according to embodiment 3 are mounted on a vehicle. The control system ECU 100 and the information system ECU 200 communicate with each other. The information system ECU 200 and the information system ECU 300 communicate with each other.

As shown in FIG. 3A, the core 20d installed with the MM-OS 21d and a core 30c installed with an MM-OS 31c are configured to perform communication between the information system ECU 200 and the information system ECU 300 via an in-vehicle communication line 53.

The core 20d in the information system ECU 200 processes an inter-processor communication program in order to communicate with the information system ECU 300. Similarly, the core 30c in the information system ECU 300 executes an inter-processor communication program on the MM-OS 31c in order to communicate with the information system ECU 200. The inter-processor communication programs in the cores 20d and 30c realize inter-processor communication functions 28d and 38c, and TCP/IP protocol stacks 27d and 37c, respectively.

The inter-processor communication functions 28d and 38c provide communication abstraction between the cores 20d and 30c, and process collaborative distributed processing between the multiple-core processor 20 and a multiple-core processor 30 including distributed application functions, i.e. the application function 25d and an application function 35c.

TCP/IP protocol stacks 27d and 37c according to embodiment 3 select a TCP/IP protocol required when the multiple-core processor 20 in the information system ECU 200 communicates with a multiple-core processor 30 in the information system ECU 300 via the in-vehicle communication line 53 such as LAN provided by Ethernet (registered trademark).

The vehicle control system according to embodiment 3 of the present invention performs parallel execution in the cores 20d and 30c respectively, and performs distributed execution using the inter-processor communication functions 28d and 38c. The vehicle control system according to embodiment 3 of the present invention enhances the performance of the application functions 25d and 35c, and provides cooperation arranged with security and the real-time processing between the control system ECU 100 and the information system ECU 200.

Embodiment 4

Figure 4A:
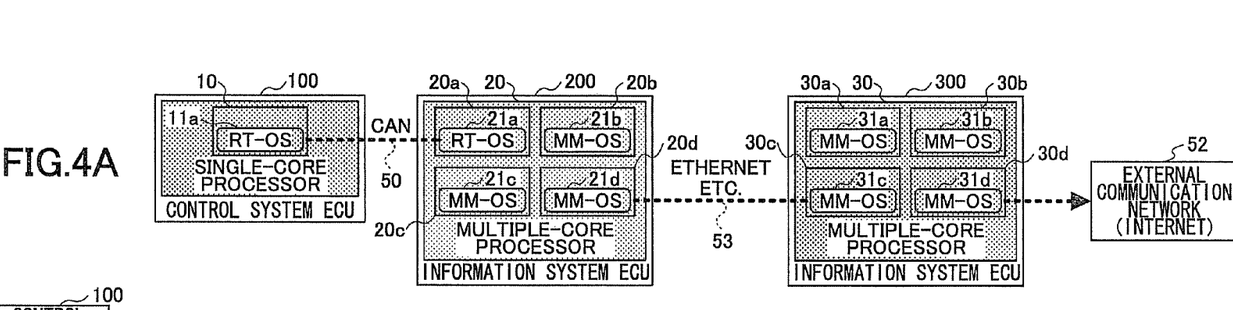
FIGS. 4A and 4B show block diagrams of a vehicle control system according to embodiment 4 of the present invention.
Figure 4B:
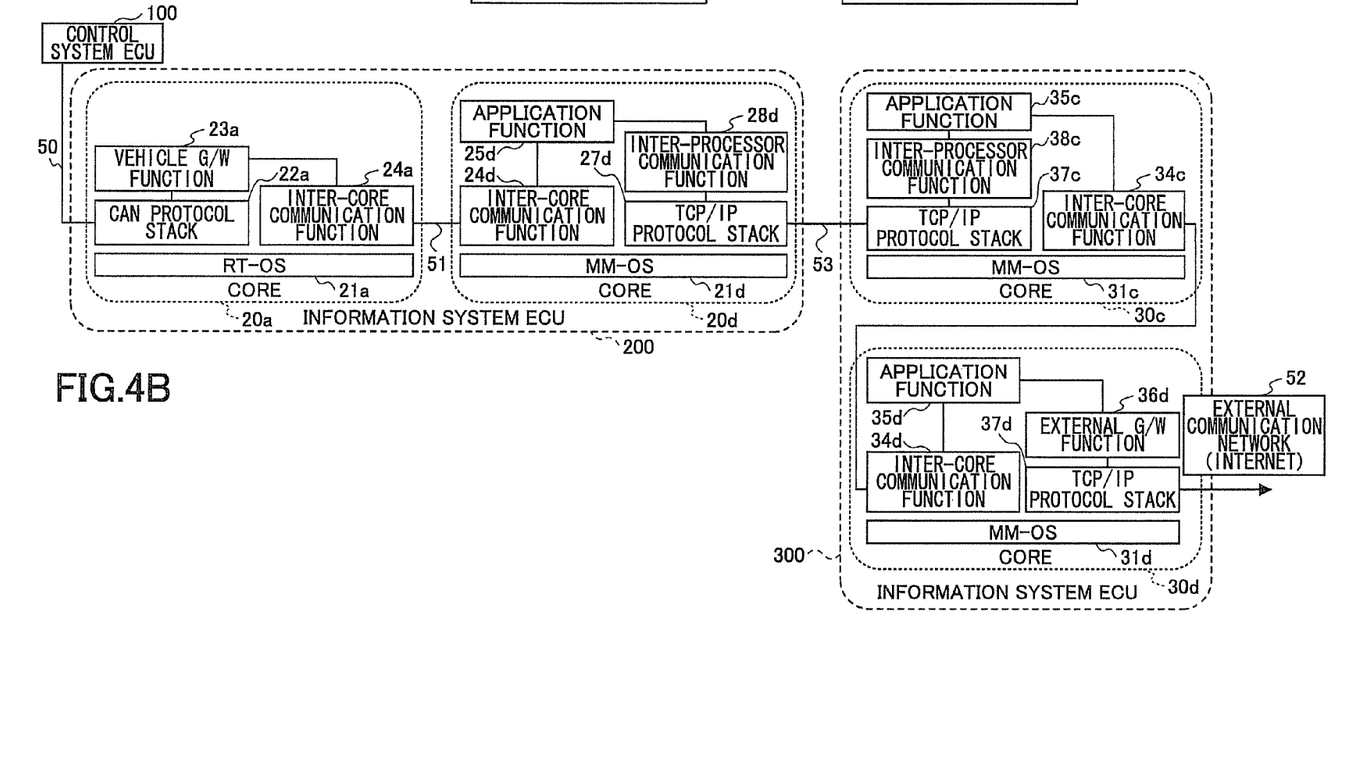

FIGS. 4A and 4B show block diagrams of a vehicle control system according to embodiment 4 of the present invention. The vehicle control system according to embodiment 4 includes the control system ECU 100, the information system ECU 200, and the information system ECU 300. The vehicle control system according to embodiment 4 is formed by combining the vehicle control systems according to embodiments 2 and 3, thereby the description will be simplified.

As shown in FIG. 4A, the core 20d installed with the MM-OS 21d and a core 30c installed with an MM-OS 31c are configured to perform communication between the information system ECU 200 and the information system ECU 300 via an in-vehicle communication line 53. A core 30d installed with an MM-OS 31d in the information system ECU 300 accesses the external communication device (not shown).

Thus, the vehicle control system according to embodiment 4 provides the same effect as that of the vehicle control systems according to embodiments 1~3.

According to embodiments 1~4, the core installed with the RT-OS monitors the real-time processing, a conversion of communication protocol, security management, and the MM-OS (the cores installed with the MM-OS's) required for the cooperation of the control system ECU and the information system ECU. On the other hand, the core installed with MM-OS processes an Internet connecting process including the multimedia process, a user interface process, and security management. The vehicle control system as described above provides a platform which is usable for a long term with enhanced reliability, and provides flexibility and extensibility.

Communicating via the core installed with the RT-OS in the information system ECU prevents the control system ECU from being influenced by an update and/or a defect of the MM-OS and/or the application program of the information system ECU. Thus, the vehicle control system as described above provides cooperation arranged with security and real-time processing between the control system ECU and the information system ECU. The vehicle control system as described above can connect with an external communication network by including a communication device such as the external G/W function and the TCP/IP protocol stack. The vehicle control system as described above can prevent the control system ECU from being influenced by the information system ECU, for example in the case where the information system ECU downloads data which could otherwise affect the vehicle control negatively. The vehicle control system as described above makes it possible to execute a downloaded application securely.

The vehicle control system as described above can flexibly respond to a multiple-cored processor, and easily provide a platform architecture with enhanced long term reliability. The information system ECU 200 can process the parallel execution and the distributed execution of the application in a plurality of the information system ECU's by including in-vehicle communication portions such as the inter-processor communication function and the TCP/IP protocol stack. The vehicle control system as described above makes it possible to enhance the processing capacity of the application. The vehicle control system as described above can prevent the control system ECU from being influenced by the information system ECU, for example in the case where the information system ECU receives data which could otherwise affect the vehicle control negatively via the in-vehicle communication line.

The control system ECU 100 constitutes the first vehicle control unit in the claims. The information system ECU 200 constitutes the second vehicle control unit in the claims. The information system ECU 300 constitutes the third vehicle control unit in the claims. The core 10 constitutes the first processor in the claims. The core 20a constitutes the second processor in the claims. Any one of the cores 20b, 20c, 20d constitutes the third processor in the claims. The core 30c constitutes the fourth processor in the claims. The core 30d constitutes the fifth processor in the claims.

The present invention is not limited to these embodiments, but variations and modifications may be made without departing from the scope of the present invention.

For example, the information system ECU may include a plurality of single-core processors instead of the multiple-core processors described above. Further, The control system ECU may include a plurality of single-core processors or a multiple-core processor instead of the single-core processor.

The present application is based on Japanese Priority Applications No. 2007-009526 filed on Jan. 18, 2007 with the Japanese Patent Office, the entire contents of which are hereby incorporated by reference.

The invention claimed is:

1. A vehicle control system comprising:
a first vehicle control unit comprising a first processor and a real-time OS installed on said first processor;
a second vehicle control unit comprising a second processor, a real-time OS installed on said second processor, a third processor, a multimedia OS installed on said third processor and a memory shared between said second and third processors;
a first communication line connecting said first processor to said second processor;
a second communication line connecting said second processor to said third processor; and
communications between the first vehicle control unit and the second vehicle control unit are performed over the first communication line using a communication function of the real-time OS installed on said first processor and a first communication function of the real-time OS installed on said second processor; communications between the second processor and the third processor are performed over said second communication line using an inter-core communication function of the real-time OS installed on said second processor and an inter-core communication function of the multimedia OS installed on said third processor.

2. The vehicle control system according to claim 1, further comprising a third vehicle control unit including a fourth processor and a multimedia OS installed on the fourth processor.

3. The vehicle control system according to claim 2, wherein the third processor is configured to access an external communication device.

4. The vehicle control system according to claim 2, wherein the fourth processor is configured to access an external communication device.

5. The vehicle control system according to claim 2, wherein the third vehicle control unit further includes a fifth processor and a multimedia OS, and wherein a communication function of the fourth processor and a communication function of the fifth processor are configured to perform communication between the fourth processor and the fifth processor, and the fifth processor is configured to access an external communication device.

6. The vehicle control system according to claim 5, wherein the fourth processor is formed of a processor-core in a multiple-core processor, and the fifth processor is formed of a processor-core in the multiple-core processor.

7. The vehicle control system according to claim 2, wherein the third and fourth processors are configured to perform communication between the second and third vehicle control units through a TCP/IP protocol.

8. The vehicle control system according to claim 2, further comprising a third communication line connecting said third processor to said fourth processor.

9. The vehicle control system according to claim 1, wherein the second processor is formed of a processor-core in a multiple-core processor, and the third processor is formed of a processor-core in the multiple-core processor.

10. The vehicle control system according to claim 1, wherein the first and second processors are configured to perform communication between the first and second vehicle control units through a CAN protocol.

11. The vehicle control system according to claim 1, wherein said inter-core communication function of the real-time OS installed on said second processor is further configured to monitor if said third processor is operating normally.

* * * * *